(12) United States Patent
Abasto et al.

(10) Patent No.: US 8,683,113 B2
(45) Date of Patent: Mar. 25, 2014

(54) CONCURRENTLY SEARCHING MULTIPLE DEVICES OF A NON-VOLATILE SEMICONDUCTOR MEMORY

(75) Inventors: Erick O. Abasto, Mission Viejo, CA (US); Jerry Lo, Hacienda Heights, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 580 days.

(21) Appl. No.: 13/021,456

(22) Filed: Feb. 4, 2011

(65) Prior Publication Data

US 2012/0203953 A1 Aug. 9, 2012

(51) Int. Cl.
*G06F 12/00* (2006.01)
(52) U.S. Cl.
USPC ..... 711/103; 711/217; 711/220; 711/E12.088

(58) Field of Classification Search
None
See application file for complete search history.

(56) References Cited

U.S. PATENT DOCUMENTS

| 7,516,267 | B2 | 4/2009 | Coulson et al. |
| 2009/0228634 | A1 | 9/2009 | Nakamura et al. |
| 2010/0061150 | A1 | 3/2010 | Wu et al. |
| 2010/0161881 | A1 | 6/2010 | Nagadomi et al. |
| 2010/0169543 | A1 | 7/2010 | Edgington et al. |

*Primary Examiner* — Kevin Verbrugge

(57) ABSTRACT

A non-volatile semiconductor memory is disclosed comprising N memory devices each comprising a plurality of blocks, wherein each block comprises a plurality of memory segments accessed through an address. A searched is performed by issuing a read command for each of the N memory devices, wherein an address of each read command is separated by a distance determined in response to the search range of addresses and N, and the search range of addresses is greater than N. Data read from at least one of the memory devices is evaluated to determine whether the search has finished.

14 Claims, 6 Drawing Sheets

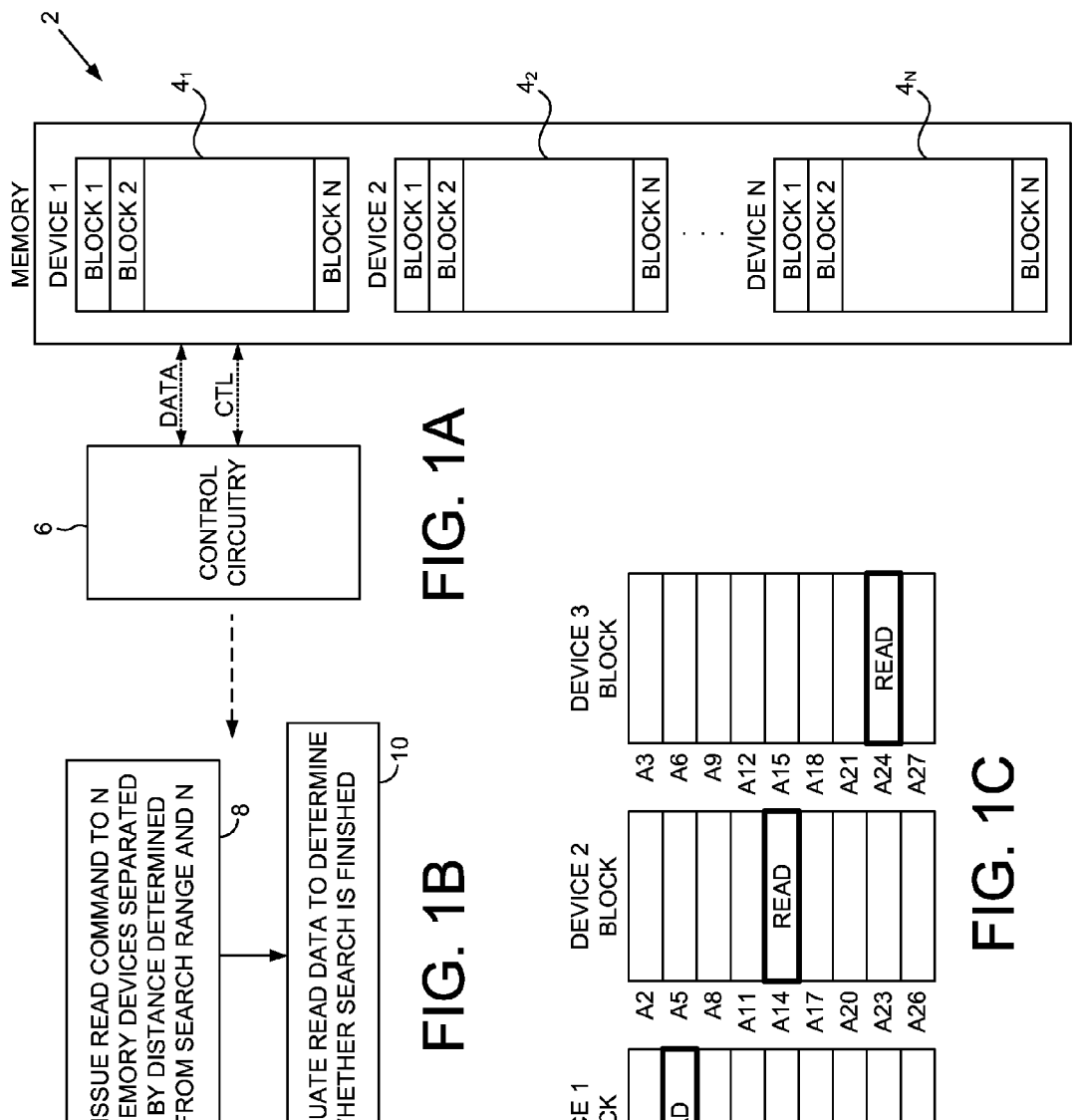

CONCURRENTLY SEARCHING MULTIPLE DEVICES OF A NON-VOLATILE SEMICONDUCTOR MEMORY

BACKGROUND

A non-volatile semiconductor memory (NVSM) may be employed as mass storage for a computer system (e.g., desktop, laptop, portable, etc.) or a consumer device (e.g., music player, cell phone, camera, etc.) or other suitable application. The NVSM may comprise one or more memory devices (such as a flash memory) and control circuitry for accessing each memory device. Each memory device is coupled to an I/O bus, as well as a number of interface control lines. When issuing a program command or an erase command to a memory device, the control circuitry transfers the address and command data (and write data for a program operation) over the I/O bus. When issuing a read command, the control circuitry transfers the address and command data over the I/O bus and then receives the read data over the I/O bus.

Each memory device typically comprises one or more memory arrays programmed in segments referred to as "pages". A number of pages are grouped into a "block", wherein a page is erased by erasing the entire block of pages. Accordingly, different pages of a single block (or partial pages) may be programmed over a number of program cycles before erasing the block with an erase cycle.

A write log is typically maintained that includes address mapping (logical block address to physical block address) as well as the last page written. The write log is periodically written to the NVSM so that it is saved across power cycles. However, when a power failure occurs it may not be possible to save the write log, and therefore the last written block cannot be determined from the write log when the NVSM is powered on. Instead, the NVSM is typically searched to locate the last written page, for example, by searching for a particular pattern that identifies the address of the last written page.

BRIEF DESCRIPTION OF THE DRAWINGS

FIG. 1A shows a non-volatile semiconductor memory according to an embodiment of the present invention comprising N memory devices.

FIG. 1B is a flow diagram according to an embodiment of the present invention wherein a search is performed by issuing a read command to each of the N memory devices, wherein an address of each read command is separated by a distance determined from a search range and N.

FIG. 1C illustrates an example embodiment wherein there are three memory devices, the search range is twenty-seven addresses, and the distance between the addresses of the read commands is nine.

FIG. 2C illustrates an example embodiment wherein the addresses of the read commands are adjusted so that the addresses modulo N are unique (so that a read command is sent to each of the N memory devices).

FIG. 2D illustrates an example embodiment of a third and final search iteration wherein consecutive addresses of read commands are issued, one for each of the N memory devices.

DETAILED DESCRIPTION OF EMBODIMENTS OF THE INVENTION

Figure 2A:
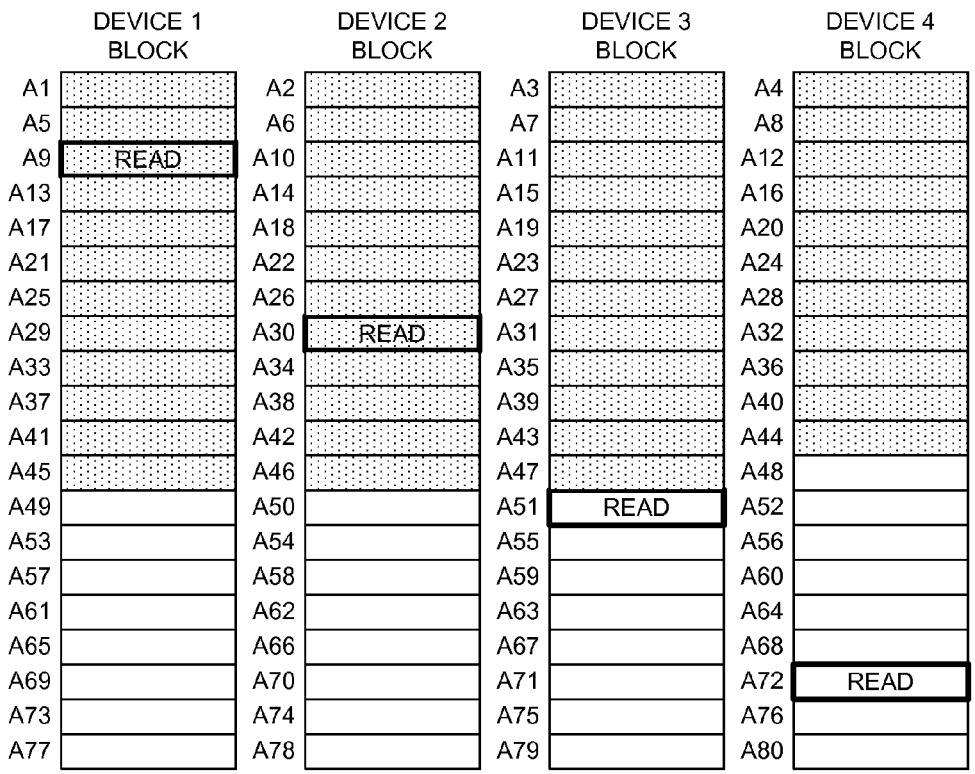
FIG. 2A illustrates an example embodiment wherein there are four memory devices, the initial search range is eighty-one addresses, and the initial distance between the addresses of the read commands is twenty.

FIG. 1A shows a non-volatile semiconductor memory 2 according to an embodiment of the present invention comprising N memory devices $4_1$-$4_N$ each comprising a plurality of blocks, wherein each block comprises a plurality of memory segments accessed through an address. The non-volatile semiconductor memory 2 further comprises control circuitry 6 operable to execute the flow diagram of FIG. 1B, wherein a searched is performed by issuing a read command for each of the N memory devices, and an address of each read command is separated by a distance determined in response to the search range of addresses and N, and the search range of addresses is greater than N (step 8). Data read from at least one of the memory devices is evaluated to determine whether the search has finished (step 10).

The non-volatile semiconductor memory 2 may comprise any suitable configuration of control circuitry 6 and memory devices $4_1$-$4_N$. In one embodiment, each memory device $4_1$-$4_N$ comprises a suitable flash memory (e.g., NAND or NOR flash), and the control circuitry 6 comprises a suitable flash controller. In one embodiment, the control circuitry 6 implements a solid state drive (SSD) by emulating a disk drive accessible by a host system using a standard disk drive communication protocol (e.g., the ATA protocol). In the embodiment of FIG. 1A, each memory device comprises a plurality of blocks, and each block comprises a plurality of memory segments referred to as pages. The memory segment that is accessed during write/read commands may comprise any suitable size, such as a full page or a partial page in a block of pages. In an embodiment of the present invention, a range of addresses assigned to the memory segments of the memory devices may be searched, for example, when attempting to find the last written page during a power failure.

FIG. 1C shows an example embodiment wherein the non-volatile semiconductor memory 2 comprises three memory devices (N=3) capable of processing write/read commands concurrently. For example, when processing a write command data may be written concurrently as a "super-block" to three consecutive addresses (e.g., A1, A2, and A3) which are each assigned to corresponding memory segments of blocks in each of the three memory devices. A read operation may then be processed by reading a super-block of three consecutive addresses, that is, by concurrently reading the corresponding memory segments from each memory device.

In one embodiment, in order to expedite searching the memory devices (e.g., to find a last written memory segment during a power failure), a read command is concurrently issued to each of the N memory devices, wherein the read addresses are separated by a distance determined from the search range and the number of memory devices N. In the example of FIG. 1C, the distance between the addresses of read commands is nine (search range divided by N). As described in greater detail below, the data read from the memory devices is then evaluated in order to update the search range of addresses, as well as the distance between the read addresses, thereby expediting the search operation by reducing the number of search iterations.

FIGS. 2A-2D illustrate an embodiment of the present invention for searching a range of addresses in order to determine a last written page during a power failure. In the example of FIG. 2A, the non-volatile semiconductor memory comprises four memory devices (N=4), and the last address written during a power failure is A47. Accordingly, a search is performed over a search range of addresses from A1 to A80 in order to find the last written address A47, wherein the initial search range from A1 to A80 represents a block of addresses that were being written prior to saving the write log.

Figure 2B:
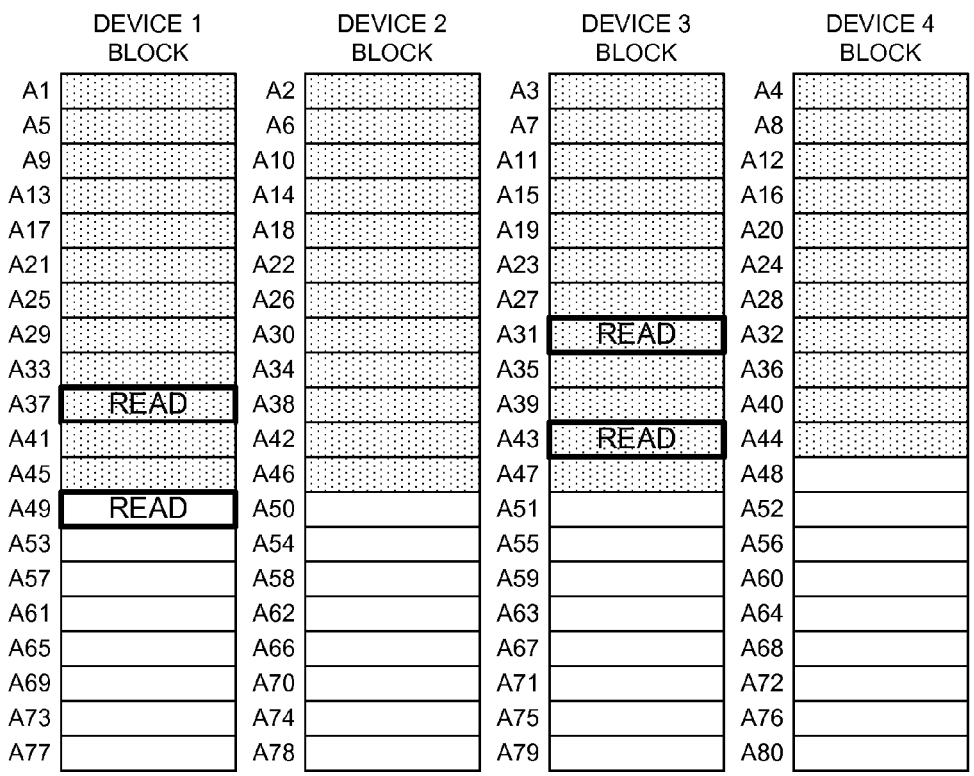
FIG. 2B illustrates an example embodiment wherein after the first search iteration, the search range is updated to twenty, and the distance between addresses of read commands is updated to five.
Figures 2C, 2D:
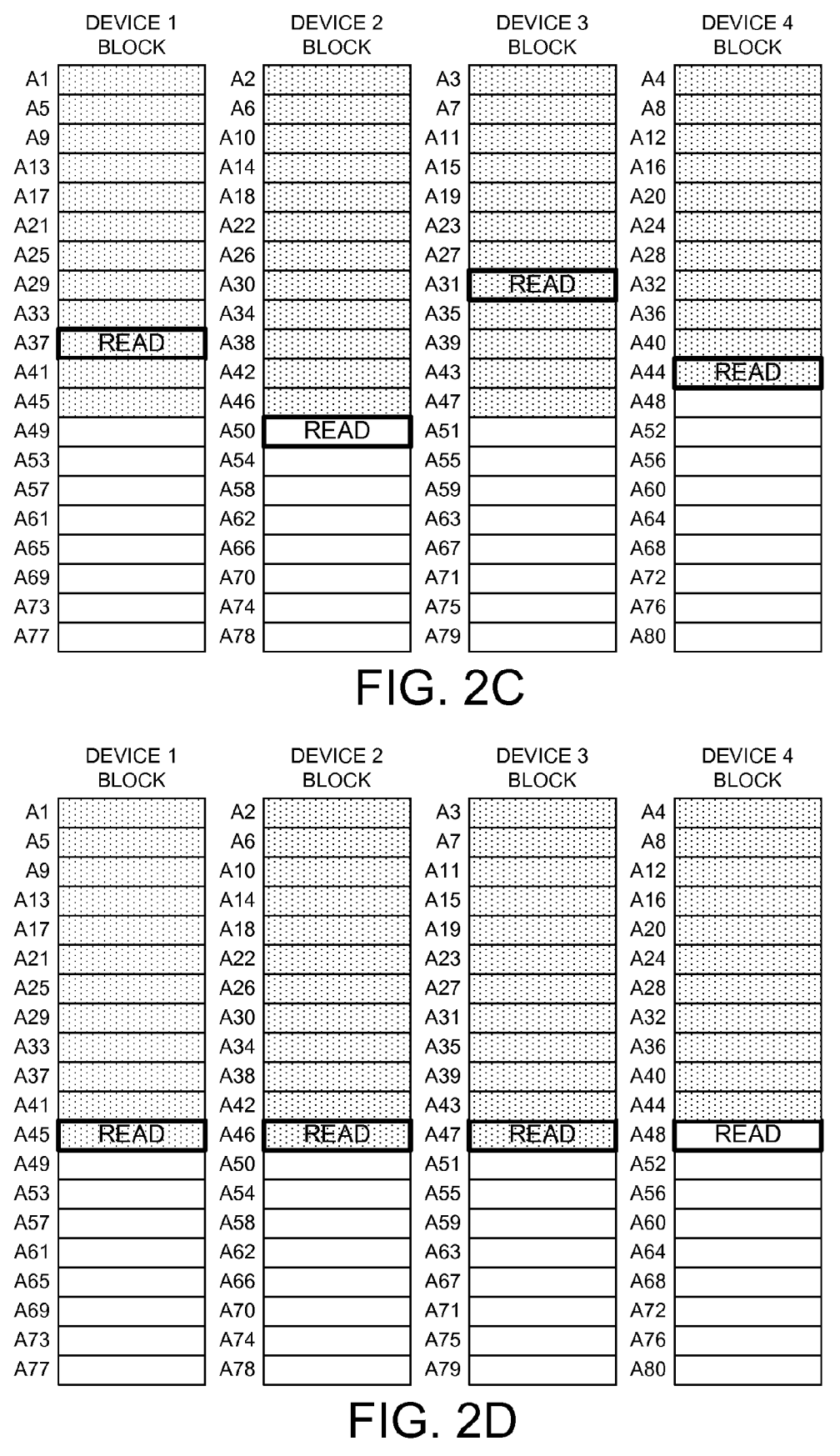
Figure 3:
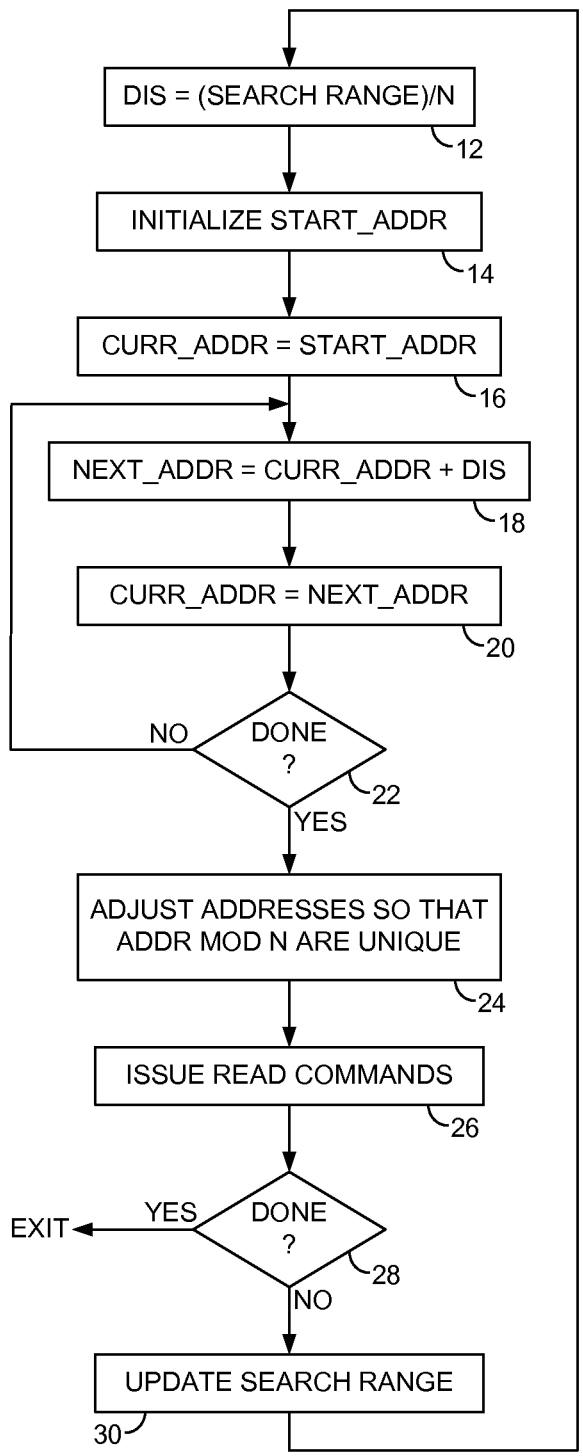
FIG. 3 is a flow diagram according to an embodiment of the present invention wherein the search range and distance between addresses of read commands are updated after each search iteration.

The iterative search steps according to an embodiment of the present invention is understood with reference to the flow diagram of FIG. 3 in view of FIGS. 2A-2D. An initial distance between read addresses is determined by integer dividing the initial search range (eighty-one) by N=4 equals twenty (step 12). A start address is initialized (step 14), such as by dividing the read distance by two and adjusting the resulting address to the first memory device. A current address is then assigned to the start address (step 16), and a next address is determined by adding the read distance to the current address (step 18). The current address is then assigned to the next address (step 20) and the process repeated until a read address has been generated for each of the N memory devices (step 22). Accordingly, in the example of FIG. 2A during the first search iteration four read commands are issued (one to each of the N memory devices), wherein the addresses of the read commands are separated by a distance of twenty.

After generating the read commands, the read addresses are adjusted if necessary (step 24) so that each addresses modulo divided by N is a unique value (so that a read command is sent to each of the N memory devices). The read commands are then issued to the N memory devices (step 26), and the data read from the memory devices is evaluated to determine whether the search has finished (step 28). If the searched is not finished, then the search range is updated (step 30) and another iteration is executed starting at step 12.

For example, the search range may be updated (step 30 of FIG. 3) relative to the last read address corresponding to a written memory segment and the first read address corresponding to an unwritten memory segment. Referring to the example of FIG. 2A, the address A30 corresponds to the last read memory segment that was previously written, and address A51 corresponds to the first read memory segment that was unwritten. Accordingly the search range is updated to A50 minus A31 plus one (twenty). The distance between the read commands is then updated (step 12) to be twenty divided by four equals five. The addresses for the read commands are then determined from a starting address (e.g., A31) by adding the updated distance (five) to each subsequent address as illustrated in FIG. 2B. However, the resulting addresses will not be unique when modulo divided by N (i.e., multiple read addresses are assigned to the same memory device). Accordingly, the read addresses are adjusted (step 24) so that the addresses modulo divided by N are unique (so that a read command is sent to each of the N memory devices). An example of the adjusted read addresses is shown in FIG. 2C wherein the last two addresses have been incremented by one.

After concurrently executing the read commands shown in FIG. 2C, the read data is evaluated to find the last written address (A44) and the first unwritten address (A50). The search range is then updated and a last search iteration is executed as shown in FIG. 2D. After executing the read commands shown in FIG. 2D, the last written address (A47) is adjacent the first unwritten address (A48) and therefore the last written address (A47) has been located and the search ends.

Any suitable technique may be used to identify a written memory segment and an unwritten memory segment. For example, in one embodiment each memory segment in a block may comprise extended data (e.g., a flag) that identifies the memory segment as written or unwritten. Accordingly, in this embodiment the data read from each memory segment may be compared to target data (e.g., a flag) to determine whether the memory segment is written or unwritten. In another embodiment, the data read from each memory segment may be processed to generate a check value (e.g., an error correction value) that identifies the memory segment as written or unwritten. The searching techniques described herein may also be used to find other types of data stored in the memory segments, or other states of the memory segments (other than the last written memory segment).

Figure 4A:
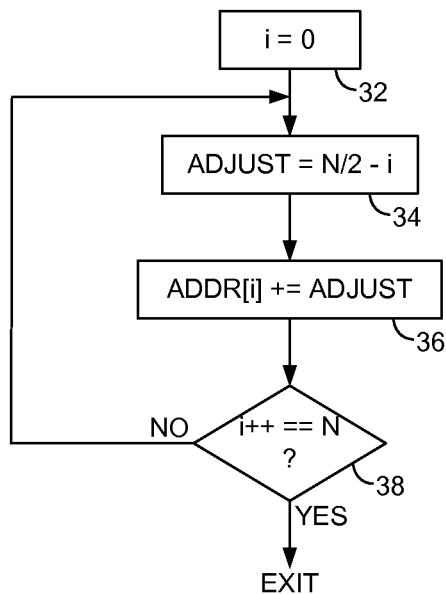
FIGS. 4A-4C show alternative embodiments for adjusting the addresses of the read commands so that the addresses modulo N are unique (so that a read command is sent to each of the N memory devices).

Any suitable technique may be used to adjust the addresses at step 24 of FIG. 3 so that the addresses modulo divided by N are unique values (so that a read command is sent to each of the N memory devices). FIG. 4A is a flow diagram according to an embodiment for adjusting the addresses wherein a counter is initialized to zero (step 32), and an adjustment value generated (step 34) for each of the N addresses. Each address is adjusted by the corresponding adjustment value (step 36), and the process is repeated until each of the N addresses has been adjusted (step 38).

Figure 4B:
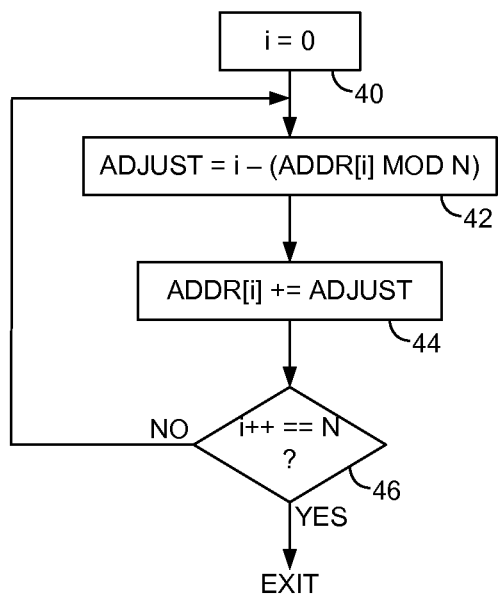

FIG. 4B is a flow diagram shown an alternative embodiment for adjusting the addresses so that the addresses modulo divided by N are unique values. A counter is initialized to zero (step 40), and an adjustment value generated (step 42) for each of the N addresses. Each address is adjusted by the corresponding adjustment value (step 44), and the process is repeated until each of the N addresses has been adjusted (step 46).

Figure 4C:
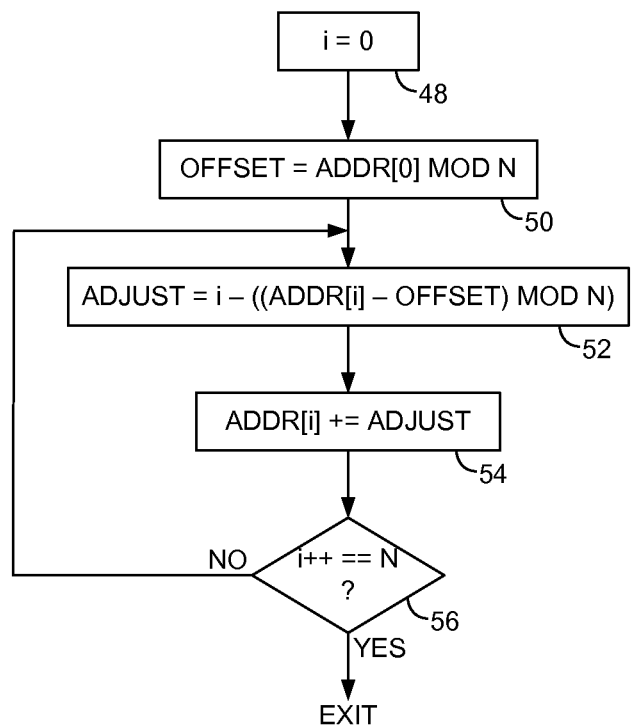

FIG. 4C is a flow diagram shown an alternative embodiment for adjusting the addresses so that the addresses modulo divided by N are unique values. A counter is initialized to zero (step 48), and an offset value is generated (step 50). An adjustment value is generated (step 42) for each of the N addresses using the offset. Each address is adjusted by the corresponding adjustment value (step 54), and the process is repeated until each of the N addresses has been adjusted (step 56).

The control circuitry 6 in the non-volatile semiconductor memory (FIG. 1A) may comprise any suitable circuitry, such as one or more integrated circuits. In one embodiment, the control circuitry 6 comprises a microprocessor executing code segments of a control program for implementing the above described flow diagrams. Alternatively, or in addition to the microprocessor, the control circuitry 6 may comprise state machine circuitry implemented in an application specific integrated circuit.

What is claimed is:

1. A non-volatile semiconductor memory comprising N memory devices each comprising a plurality of blocks, wherein each block comprises a plurality of memory segments accessed through an address, and control circuitry operable to search within a search range of addresses by:
issuing a read command for each of the N memory devices, wherein:
an address of each read command is separated by a distance determined in response to the search range of addresses and N; and
the search range of addresses is greater than N; and evaluating data read from at least one of the memory devices to determine whether the search has finished.

2. The non-volatile semiconductor memory as recited in claim 1, wherein the N memory devices are operable to concurrently process the respective read commands.

3. The non-volatile semiconductor memory as recited in claim 1, wherein the control circuitry is operable to determine the distance by dividing the search range of addresses by N.

4. The non-volatile semiconductor memory as recited in claim 1, wherein the control circuitry is operable to update the search range in response to evaluating the data read from at least one of the memory devices.

5. The non-volatile semiconductor memory as recited in claim 4, wherein the control circuitry is operable to reduce the search range in response to evaluating the data read from at least one of the memory devices.

6. The non-volatile semiconductor memory as recited in claim 5, wherein the control circuitry is operable to reduce the search range relative to when data matches target data and when data does not match the target data.

7. The non-volatile semiconductor memory as recited in claim 1, wherein the control circuitry is operable to adjust a first address of a first read command in response to a modulo division of the first address by N.

8. A method of searching a non-volatile semiconductor memory comprising N memory devices each comprising a plurality of blocks, wherein each block comprises a plurality of memory segments accessed through an address, the method comprising:

issuing a read command for each of the N memory devices, wherein:
   an address of each read command is separated by a distance determined in response to the search range of addresses and N; and
   the search range of addresses is greater than N; and
evaluating data read from at least one of the memory devices to determine whether the search has finished.

9. The method as recited in claim 8, wherein the N memory devices are operable to concurrently process the respective read commands.

10. The method as recited in claim 8, further comprising determining the distance by dividing the search range of addresses by N.

11. The method as recited in claim 8, further comprising updating the search range in response to evaluating the data read from at least one of the memory devices.

12. The method as recited in claim 11, further comprising reducing the search range in response to evaluating the data read from at least one of the memory devices.

13. The method as recited in claim 12, further comprising reducing the search range relative to when data matches target data and when data does not match the target data.

14. The method as recited in claim 8, further comprising adjusting a first address of a first read command in response to a modulo division of the first address by N.

\* \* \* \* \*